(12) United States Patent
O'Connor

(10) Patent No.: US 7,006,527 B1
(45) Date of Patent: Feb. 28, 2006

(54) MULTISTAGE PIPELINE BIT CONVERSION

(75) Inventor: Stephen O'Connor, Mtn. View, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 887 days.

(21) Appl. No.: 09/977,031

(22) Filed: Oct. 12, 2001

(51) Int. Cl.
*G06F 3/00* (2006.01)

(52) U.S. Cl. ............................ 370/466; 710/66; 341/67

(58) Field of Classification Search ................ 370/466, 370/470, 419, 463; 341/67; 710/66; 709/250
See application file for complete search history.

(56) References Cited

U.S. PATENT DOCUMENTS

| | | | |
|---|---|---|---|
| 6,414,609 B1 * | 7/2002 | Zukawa et al. ................ | 341/67 |
| 6,429,794 B1 * | 8/2002 | Widmer et al. ............. | 341/100 |
| 6,598,103 B1 * | 7/2003 | MacWilliams et al. ..... | 710/105 |
| 6,633,944 B1 * | 10/2003 | Holm et al. ................ | 710/306 |
| 6,892,252 B1 * | 5/2005 | Tate ............................ | 710/30 |

OTHER PUBLICATIONS

10 Gigabit Ethernet Alliance [online]. "10 Gigabit Ethernet Technology Overview White Paper", May, 2001 Revision 1.0. Retrieved from Internet: <URL: http://www.10gea.org>.

Agere Systems, "10 Gigabit Ethernet PCS Intellectual Property Cores (Preliminary Data Sheet)", Jul. 2001. Retrieved from <URL: www.agere.com>.
Dugan, et al., "64b/66b Coding Update" [Presentation Materials], IEEE 802.3ae, Albuquerque, NM, Mar. 6, 2000.
McCarley [Initiator of discussion], 'Re: 64b/66b gearbox in FPGA.' (Threaded Discussion on the Comp.arch.fpga vsnet newsgroup) [online], Jan./Feb., 2001. Retrieved from Internet:<URL: www.fpga-faq.com/archives/28975.html> and similar pages [retrieved on Jun. 22, 2001].

* cited by examiner

*Primary Examiner*—Min Jung
(74) *Attorney, Agent, or Firm*—Kevin L. Daffer; Daffer McDaniel, LLP

(57) ABSTRACT

A system and method that converts a series of input data words at a first data width to a series of output data words at a smaller data width. In order to achieve 10-Gigabit Ethernet over an optical network, data must be converted from 66-bit words to 64-bit words (the smaller data width) at a faster clock rate, such that the concatenation of the series of input data is equivalent to the concatenation of the series of output data. This is accomplished by shifting the input data such that it is either prefixed by zeros, suffixed by zeros, or both, depending on the stage of the progression of the series. The shifted data is then split up, with a portion of the data going into a delay register and another portion of the data either being output directly or combined with data previously stored in the delay register.

13 Claims, 10 Drawing Sheets

MULTISTAGE PIPELINE BIT CONVERSION

BACKGROUND OF THE INVENTION

1. Field of the Invention

The invention relates generally to communication over networks, and more particularly to signal mapping prior to transmitting the signal over a network.

2. Background of the Invention

Electronic information is often shared through computer networks. These networks can vary in size from small networks of just a few devices sharing information to large-scale global networks, such as the Internet. Regardless of the size, there must be a mechanism in every network to transport information. Information in the form of electrical signals are often transported through copper cable; information in the form of optical signals are transported through fiber optic cables; and other electromagnetic waves can be transported through the air.

FIG. 1 shows several devices connected together through an optical network 110. Optical networks have several advantages, including a large bandwidth, low susceptibility to interference, light-weight cables, and an ability to transmit information digitally rather than in analog form. Devices attached to an optical network might include a switch 120, a server 140, and a network attached storage (NAS) 150.

Switch 120 is a device that filters and forwards packets of information between local area network (LAN) clients 130. Clients 130 can include a desktop computer, laptop, personal digital assistant (PDA), printer or other network attached device.

Server 140 controls network resources. For example a file server stores files, a print server manages one or more printers, a network server manages network traffic, and a database server processes database queries. Servers 140 can include UNIX servers, NT servers, Windows 2000 servers, LINUX servers, or other computer systems attached to the network. Network attached storage 150 is a special type of server 140 that is dedicated to file sharing and cannot perform other functions, such as authentication or file management.

Each device 120, 140, and 150 must have an interface circuit 160 installed in order to communicate across optical network 110. Signals on optical network 110 travel at a rate faster than devices 120, 140, and 150 can process. Also, optical signals are serialized (travel bit by bit) and devices 120, 140, and 150 use parallel data streams. Therefore, interface circuit 160 translates serial optical signals into a slower, parallel data stream when receiving optical information, and conversely translates parallel data streams into faster, serial bit streams when transmitting information.

Many interface circuits 160 known in the art use older Ethernet protocol standards. Specifically, these older Ethernet protocols allowed throughputs of only 10 megabits per second over a network medium. However, a newer, faster, 10-Gigabit Ethernet standard has recently been defined. Old interface circuits 160 cannot be readily adapted for use with the new standard because both translations from the transport medium to the devices on the network and collision detection mechanisms function differently.

BRIEF SUMMARY OF THE INVENTION

The invention provides a system that converts words of pipelined data from a first data width to a smaller data width over a series of cycles. Converting data widths is often a by-product of transporting data over an optical network because of the limitations of fiber optic cables. The result of the conversion is that concatenation of the input data at the first data width is equal to concatenation of the output data at the smaller data width. The system has a pipeline control, a delay register, a combinor circuit, and output conduits.

The pipeline control generates a word that is at least twice as wide as the smallest data width and shifts the pipelined data word within the generated word. Depending on the cycle, the shift causes the pipelined data word to be either prefixed by zeros, suffixed by zeros, or both. Once the pipeline data word is shifted within the generated word, the generated word is output as a residual portion and a current portion. The residual portion is at least as wide as the smaller data width and the current portion is at least as wide as the smaller data width.

The delay register receives at least a portion of the residual portion of the data from the pipeline control and delays that portion one cycle from the current portion.

The combinor circuit compares the delayed residual portion from the delay register with the current portion of data from the pipeline control, and outputs the result, the result having a width equal to the smaller data width.

The output conduits transport the current portion of the data during the initial cycle, the combinor circuit output portion of the data during the non-initial cycles, and the residual portion of the data during the final cycle of each complete series.

The invention also provides a method of converting a series of input data words of a first data width to a series of output data words of a smaller data width. The first step is identifying a first portion and a second portion of each input data word, the size of each portion being dependant on the progression of the input series. Initially, the size of the first portion is equal to the smaller data width, gradually decreasing as the input series progresses. Conversely, the size of the second portion is small at first, gradually increasing until it is equal to the smaller data width when the input series is completed.

The next step is delaying the second portion of each input data word. This step is done for all non-final sequences of each input series. Delaying is not necessary for the final sequence because the initial sequence of an input series does not use any data from the previous series. However, some implementations may also delay the second portion for the final sequence of each completed input series merely as a by-product of a specific circuit configuration.

The next step is combining the delayed second portion with the first portion for the non-initial sequences of each input series. Once again, the initial sequence of an input series does not use any data from the previous series, so no delayed second portion is needed for combining during the initial sequence.

The final steps involve outputting. For the initial sequence of each output series the first portion is output. In subsequent sequences of each output series the output is the previously derived combination. In the final sequence of each completed output series, the output is the second portion.

DETAILED DESCRIPTION OF THE INVENTION

Figure 1:
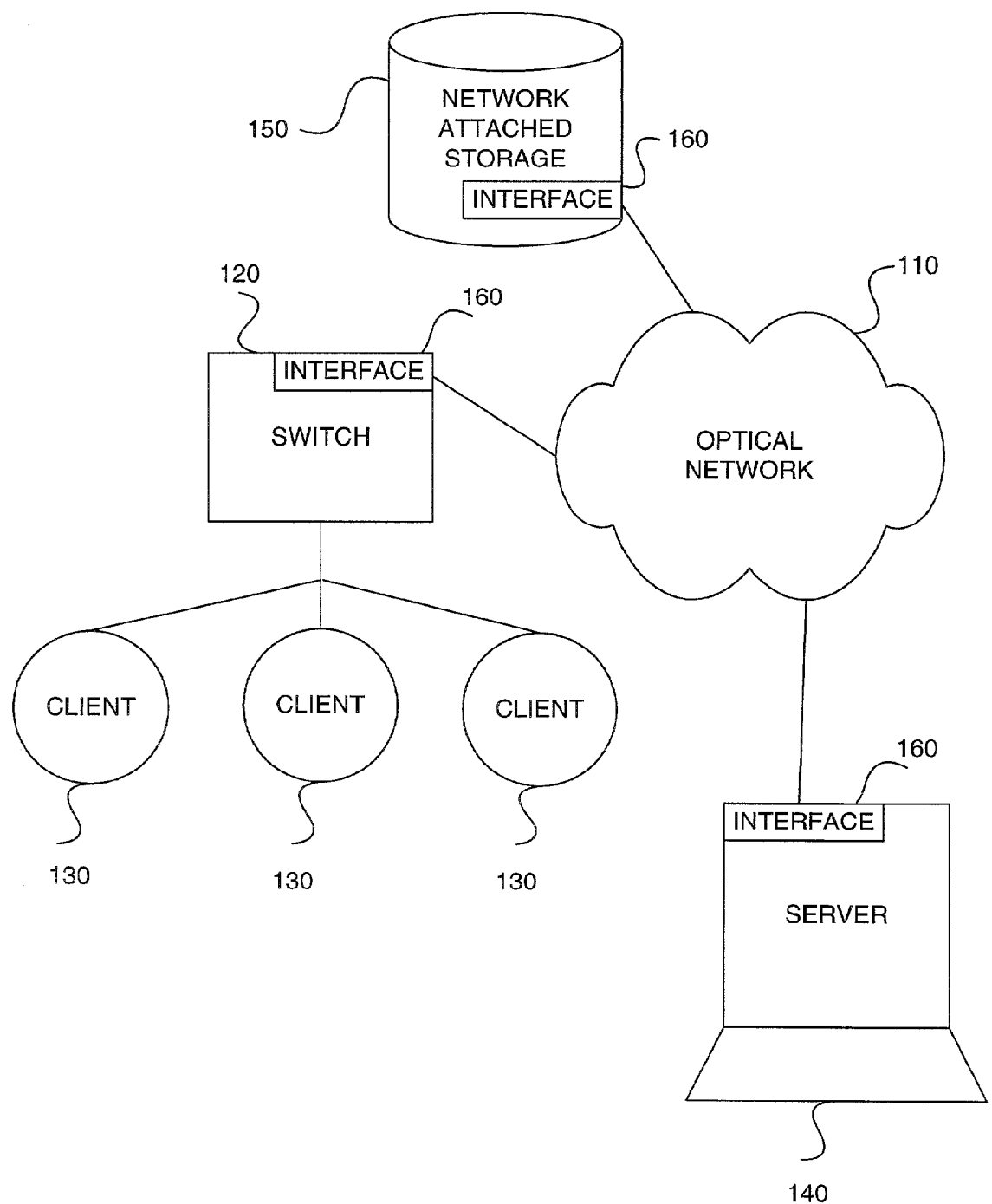
FIG. 1 is a prior art diagram of various devices on an optical network.
Figure 2:
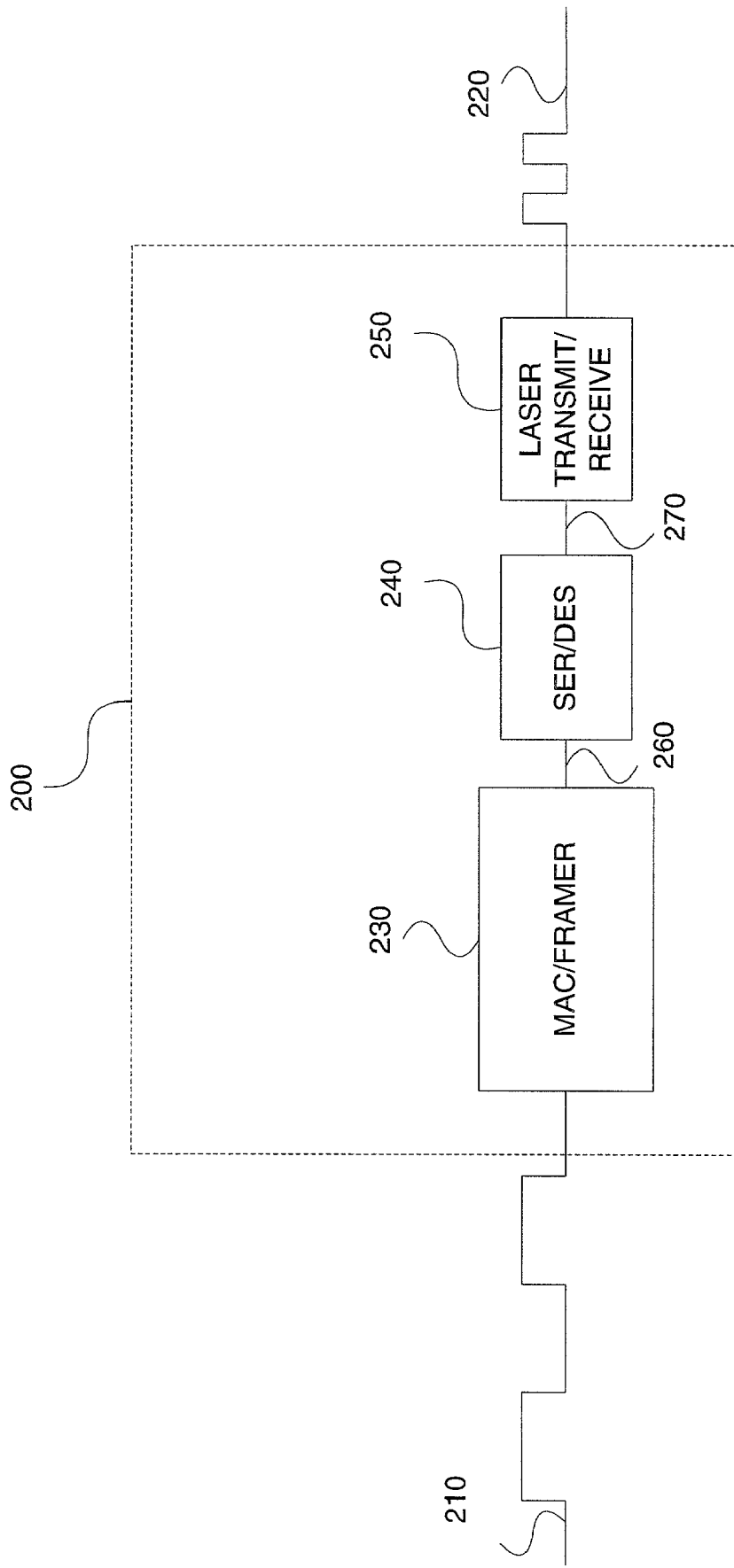
FIG. 2 is a diagram of an interface circuit.

FIG. 2 shows an interface circuit 200 that allows devices to transmit information over optical network 110 by converting a 64-bit unencapsulated signal 210 at a first clock rate to an optical signal 220 at a second clock rate. Interface circuit 200 includes a MAC/framer circuit 230, a serializer/deserializer circuit 240, and a laser transmit/receive circuit 250.

During a transmit operation, MAC/framer circuit 230 receives 64-bit unencapsulated signal 210 from the device attempting to communicate data over optical network 110, encapsulates the data in accordance with Ethernet protocols, and prepares the data for transmission over optical network 110. An output signal 260 from MAC/framer circuit 230 is also 64 bits wide, but travels at an intermediate clock rate that is faster than 64-bit unencapsulated signal 210 and includes both the original data and the encapsulation information.

Serializer/deserializer circuit 240 transforms output signal 260 from a 64-bit parallel stream into a serial signal 270. Laser transmit/receive circuit 250 converts serial signal 270 into optical signal 220 and transports optical signal 220 over optical network 110. Both serial signal 270 and optical signal 220 communicate at the second clock rate, which can be up to 10-Gigabits per second under the new Ethernet standard.

The receive operation works the same way, but in reverse. Laser transmit/receive circuit 250 receives optical signal 220 and converts it into serial signal 270, an electrical signal of the same clock rate as optical signal 220. Serializer/deserializer circuit 240 transforms serial signal 270 into output signal 260, a slower 64-bit parallel encapsulated signal. MAC/framer 230 converts output signal 260 into 64-bit unencapsulated signal 210, which is then usable by the device receiving the information from optical network 110.

The process of encapsulation by MAC/framer 230 includes both adding extra fields, such as an opening flag, an address, a closing flag and a CRC field, and adding a 2-bit synch control word to every 64 bits of data. The added fields only occur once with each frame of data, so not compensating for the extra time required to transmit that information does not greatly effect the overall transmission speed. However, the extra 2-bit synch control occurs with every 64 bits of data, so the effect on overall speed is significant. MAC/framer 230 compensates for the extra 2 bits by converting the data and synch control (66 bits total) into a 64-bit word traveling at the intermediate clock rate.

Figure 3:
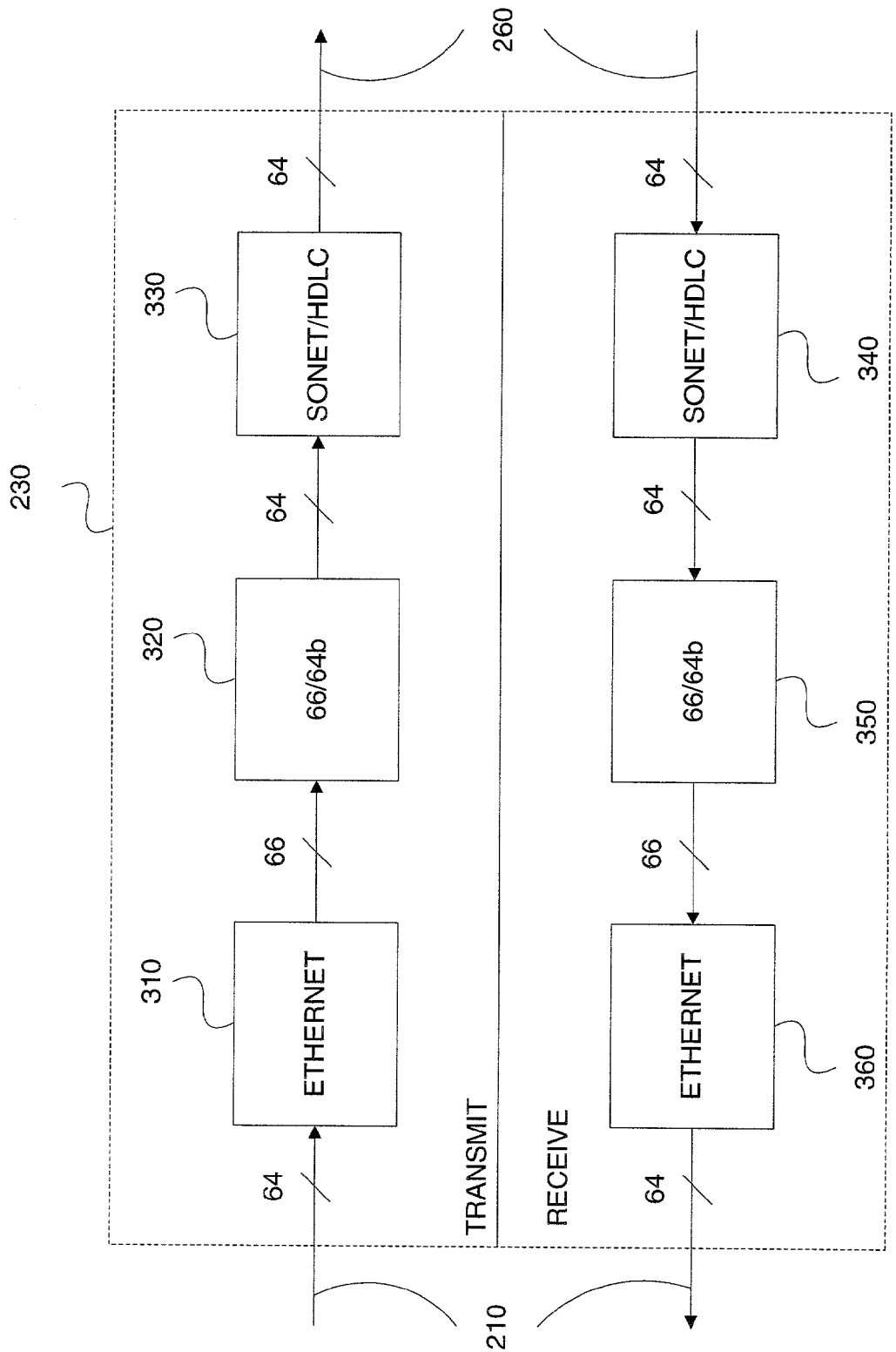
FIG. 3 is a diagram of a MAC/framer component of the interface circuit.

FIG. 3 shows a MAC/framer circuit 230 with transmit and receive functions. When transmitting, MAC/framer circuit 230 uses a transmit Ethernet circuit 310, a transmit 66/64b converter circuit 320, and a transmit SONET/HDLC circuit 330. When receiving, MAC/framer circuit 230 uses a receive SONET/HDLC circuit 340, a receive 66/64b converter circuit 350, and a receive Ethernet circuit 360.

Transmit Ethernet circuit 310 ensures all devices can understand one another by adhering to an Ethernet communication standard, detailing the physical and the lower software layers. Additionally, transmit Ethernet circuit 310 appends the 2-bit synch control to every 64 bits of data. Conversely, receive Ethernet circuit 360 strips all excess information and removes the 2-bit synch control from the data.

Transmit 66/64b converter circuit 320 converts a 66-bit data stream into a 64-bit data stream. The relationship between the clock rate of the signal entering transmit 66/64b converter circuit 320 and the clock rate of the signal leaving circuit 320 is the exiting signal is 33:32. No data is lost as long as 33 cycles of 64-bit data takes the same amount of time to propagate as 32 cycles of 66-bit data. Similarly, receive 66/64b converter circuit 350 slows down and expands a 64-bit data stream into a 66-bit data stream.

Transmit SONET/HDLC circuit 330 prepares bit streams for conversion to or from optical signals following the synchronous optical network (SONET) and high level data link control (HDLC) standards. Transmit SONET/HDLC circuit 330 completes the encapsulation process by ensuring the data stream adheres to the requirements of optical network 110. Receive SONET/HDLC circuit 340 merely reverses the process.

Figure 4:
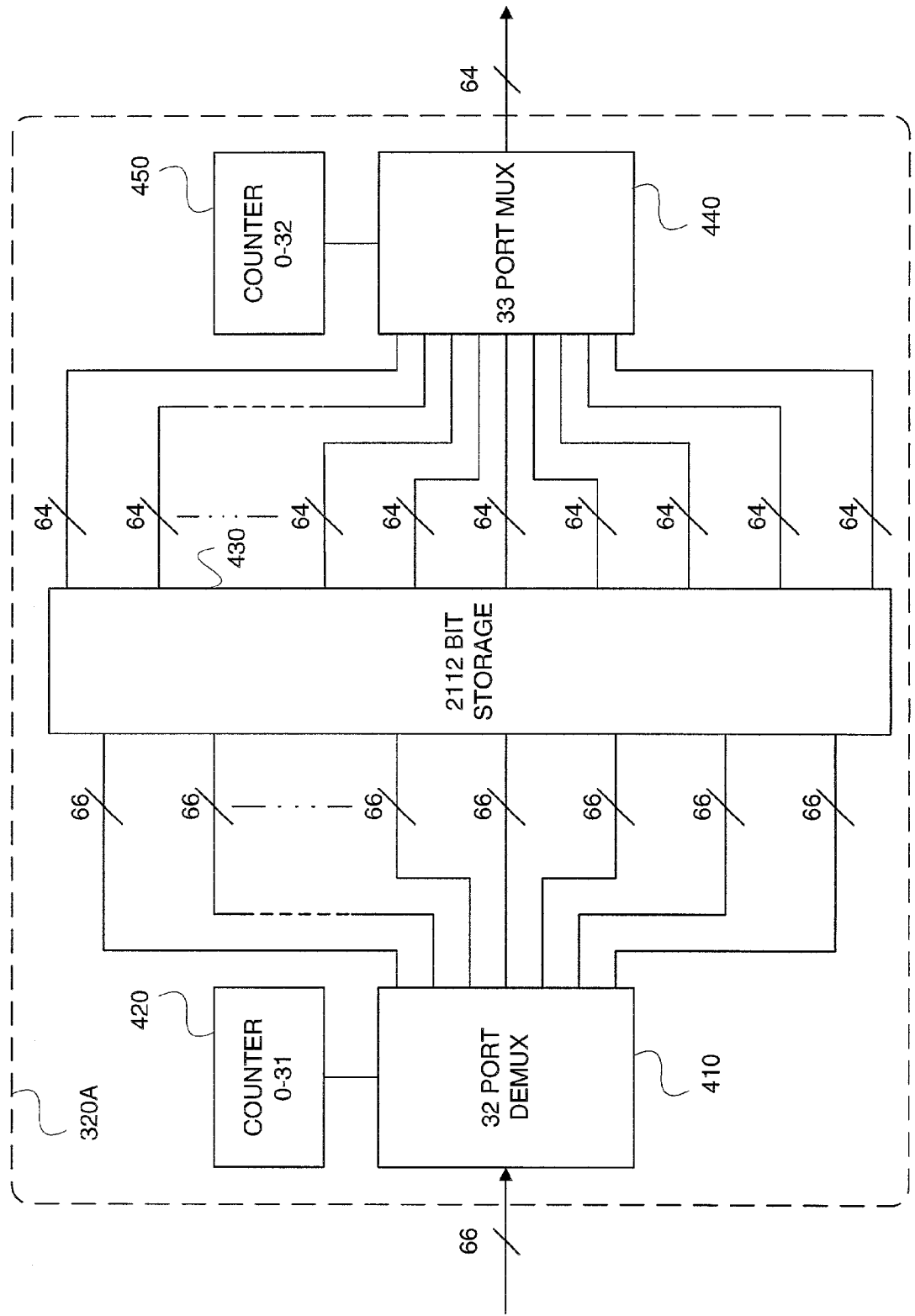
FIG. 4 is a diagram of a "brute force" construction of a transmit 66/64b converter circuit.

FIG. 4 shows a "brute force" construction of a transmit 66/64b converter circuit 320A. Components of the circuit are a 32-port demultiplexor 410, a 32-cycle counter 420 attached to 32-port demultiplexor 410, a 2112-bit memory storage 430, a 33-port multiplexor 440, and a 33-cycle counter 450 attached to 33-port multiplexor 440.

During every cycle at the first clock rate a 66-bit data word enters 32-port demultiplexor 410 and, depending on the state of 32-cycle counter 420, is stored in one of 32 groups of storage. The state of 32-cycle counter 420 changes with every cycle at the first clock rate and resets to zero after 32 cycles.

During every cycle at the intermediate clock rate a 64-bit data word from the 2112-bit memory storage 430 is, depending on the state of 33-cycle counter 450, selected from storage 430 and outputted from 33-port multiplexor 440. The state of 33-cycle counter 420 changes with every cycle at the intermediate clock rate and resets to zero after 33 cycles.

Figure 5A:
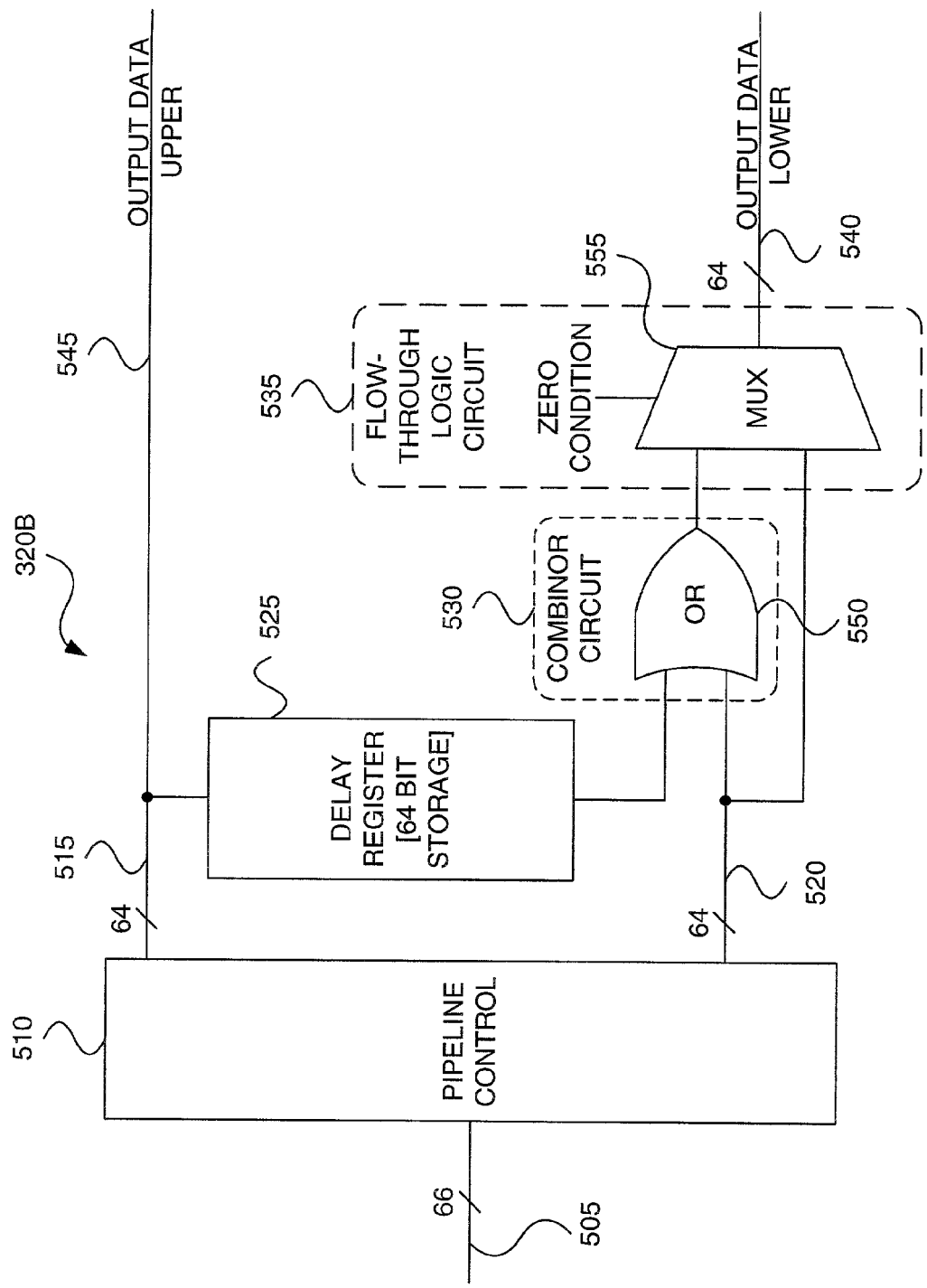
FIG. 5A is a diagram of a preferred embodiment of a transmit 66/64b converter circuit.

FIG. 5A shows a preferred embodiment of a transmit 66/64b converter circuit 320B. Briefly, a data conduit 505 provides input to a pipeline control 510, which outputs a residual portion 515 and a current portion 520. Residual portion 515 outputs to both a delay register 525 and an upper data output 545. A combinor circuit 530 combines data from current portion 520 with the data from delay register 525. Both combinor circuit 530 output and current portion 520 act as inputs to flow-through logic circuit 535, which outputs to a lower data output 540.

A continuous stream of 66-bit words from conduit 505 is the input to converter 320B. As will be described in connection with FIGS. 6A and 6B, pipeline control 510 shifts the 66-bit input string from 0 to 62 positions depending on the input cycle within each series. The maximum shift, therefore, would result in 62 zeros prefixing the 66-bit string input. The minimum shift would result in 62 zeros suffixing the 66-bit string input. After shifting the data, pipeline control 510 splits the data into two 64-bit outputs: residual portion 515 and current portion 520.

The residual portion 515 is received by delay register 525 and used in the next cycle. However, since the series resets after every 32 input cycles the first output cycle ("zero condition") of each series does not use the delayed data ("residue") in any meaningful way. Flow-through logic circuit 535 responds to the zero condition by outputting the first 64 bits of data of the original 66-bit data string from current portion 520 as lower data output 540. The remaining 2 bits of the 66-bit string are outputted to residual portion 515 and stored in delay register 525, which delays the residue for one cycle.

During the middle cycles, 64-bit current portion 520 and the delayed residue in delay register 525 are combined by combinor circuit 530. The number of zeros prefixing current portion 520 equals the meaningful data in delay register 525. Therefore, the function of combinor circuit 530 is to combine the delayed residue and current portion 520 to result in a 64-bit lower data output 540 string. For example, in the second cycle of each series, the 66-bit input string is shifted by 2 bits so that current portion 520 is made up of 2 bits of zeros and 62 bits of data. The 2 bits of the delayed residue from the first cycle replace the 2 bits of zeros prefixing the 62 bits of data. Although delay register 525 is shown holding 64 bits, it can be designed to hold 62 bits, which is equivalent to the maximum shift. In the embodiment shown in FIG. 6A, combinor circuit 530 is an OR gate 550. The combined result is then sent to flow-through logic circuit 535, which outputs data to lower data output 540.

During the last cycle of the series of 32 66-bit words, there are 62 bits of residue in delay register 525. When combined with the 2 bits of meaningful data in current portion 520, lower data output 540 defines the $32^{nd}$ 64-bit output. The $33^{rd}$ 64-bit data output is defined by current upper data output 545. Therefore, both the $32^{nd}$ 64-bit output and the $33^{rd}$ 64-bit data output are produced in the last cycle of the series of 32 66-bit words.

After the last cycle, the function of flow-through logic circuit 535 is to prevent the residue from the completed series from being combined with the data of the active series. In the embodiment depicted, flow-through logic circuit 535 is a multiplexor 555 that selects current portion 520 for the zero condition, and data from combinor circuit 530 for the non-zero conditions.

Figure 5B:
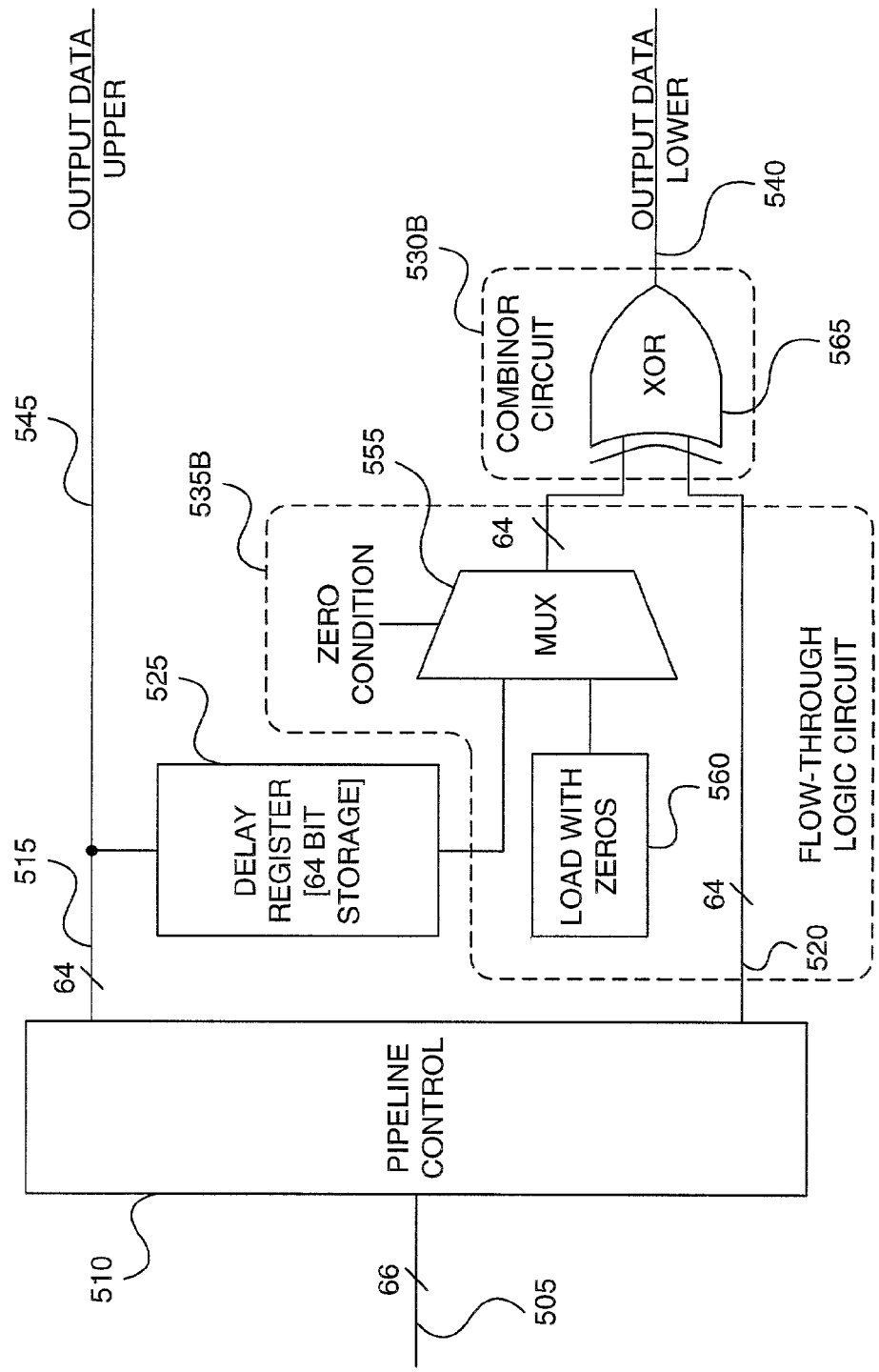
FIG. 5B is a diagram of another preferred embodiment of a transmit 66/64b converter circuit.

FIG. 5B shows another embodiment of the invention. Although each element performs the same function as the elements shown in FIG. 5A, flow-through logic circuit 535B and combinor circuit 530B have different configurations. Pipeline control 510, delay register 525, lower data output 540, and upper data output 545 are, however, identical to the elements shown in FIG. 5A.

Flow-through logic circuit 535B includes both a multiplexor 555 and a circuit 560, such as a direct connection to ground, that loads multiplexor 555 with zeros for the zero condition. For the non-zero conditions, data flows from delay register 525. The output of flow-through logic circuit 535B and current portion 520 are the inputs to combinor circuit 530. Combinor circuit 530B is shown as an XOR gate 565, which can be used as an equivalent to OR gate 550 shown in FIG. 5A.

Figure 5C:
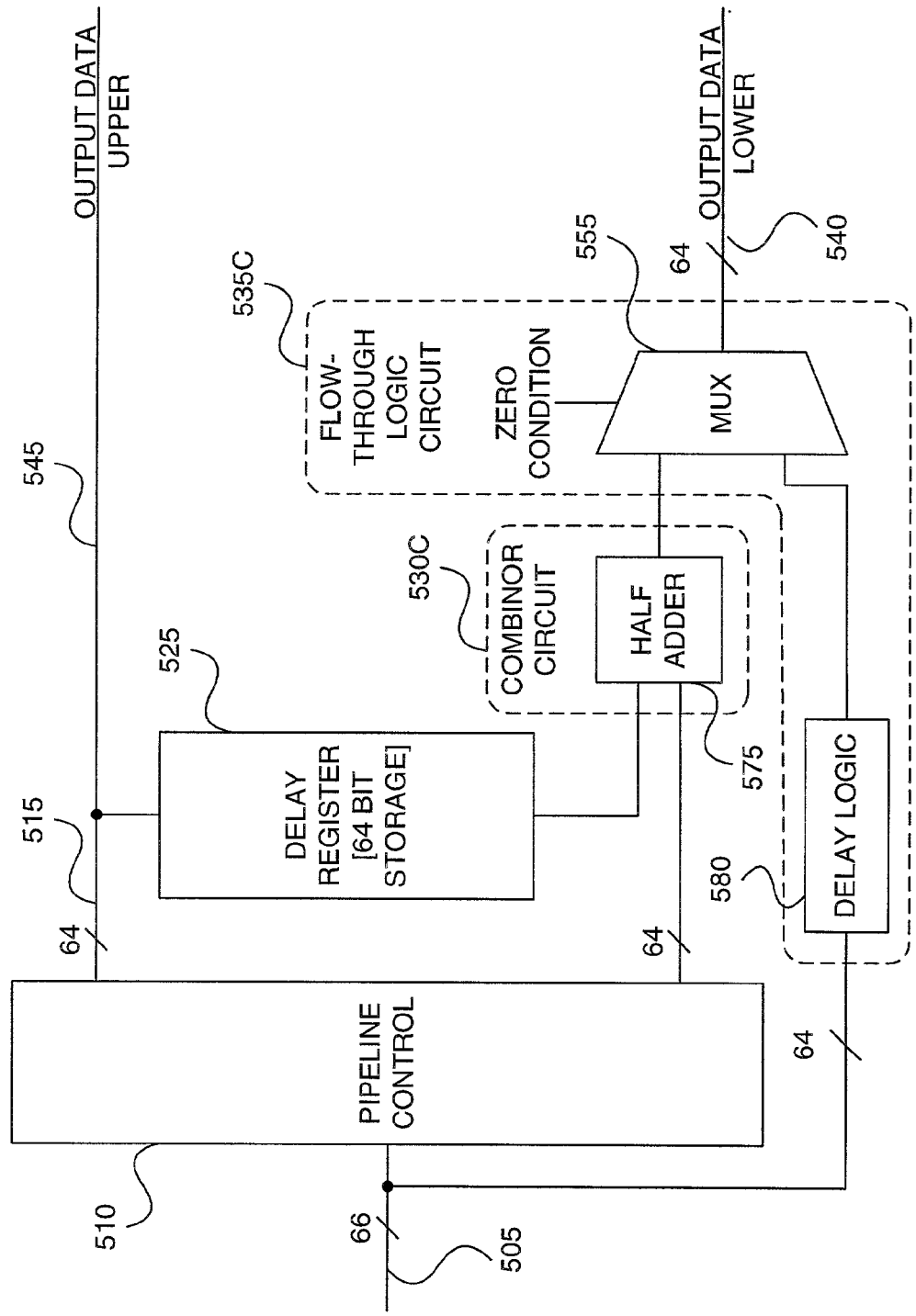
FIG. 5C is a diagram of another preferred embodiment of a transmit 66/64b converter circuit.

Similarly, FIG. 5C shows yet another configuration of combinor circuit 530C and flow-through logic circuit 535C. Inputs to combinor circuit 530C are delay register 525 and current portion 520. Like FIG. 5A, flow-through logic circuit 535 disregards combinor circuit 530C output for the zero condition. Data from the first cycle of the series comes directly from conduit 505. In order to function properly, a delay circuit 580 synchronizes the first 64 bits of the 66-bit string with pipeline control 510 and combinor circuit 530C, which is shown as a half-adder 575.

Figure 6A:
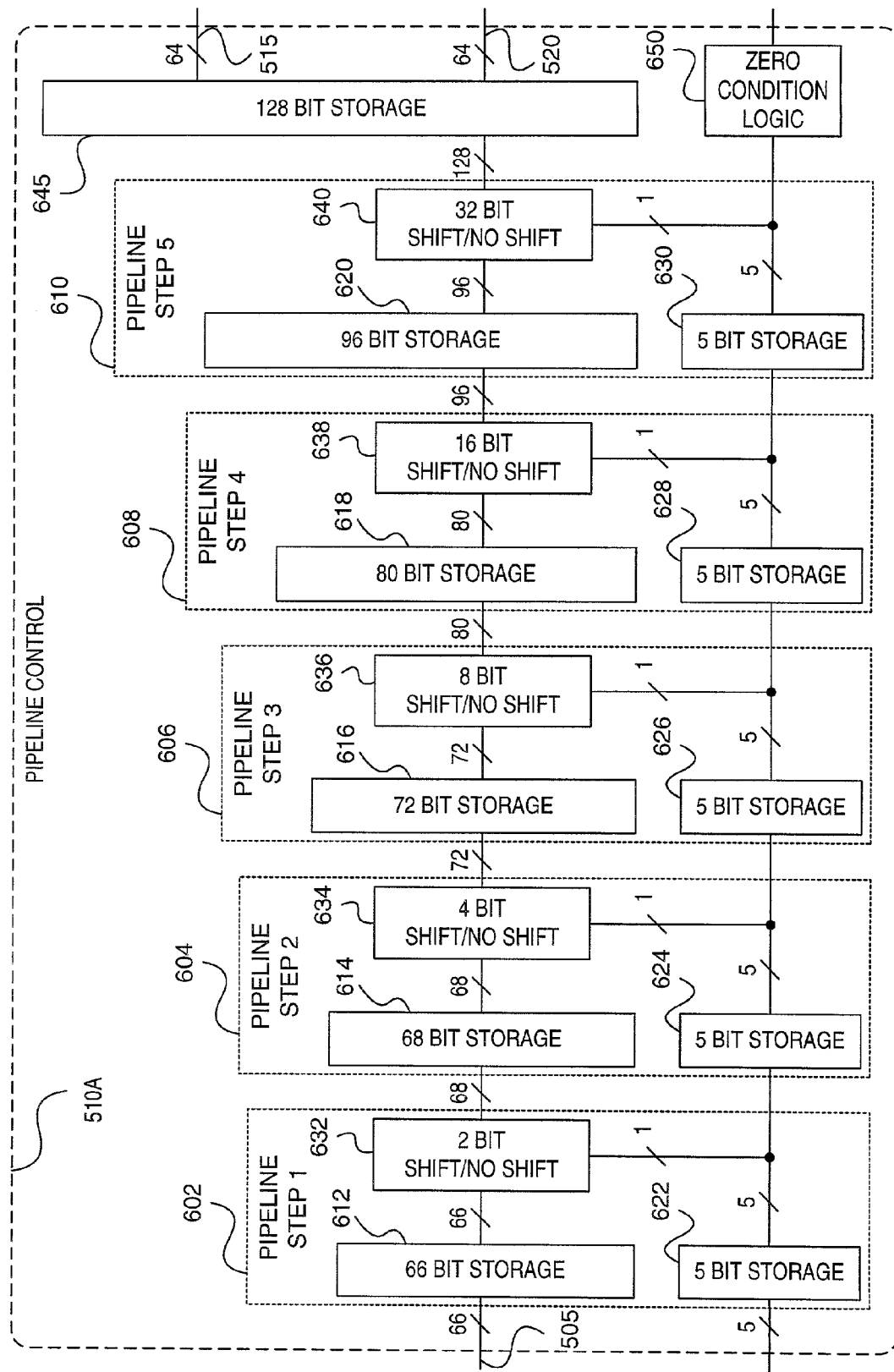
FIG. 6A is a diagram of a preferred embodiment of a pipeline control component.
Figure 6B:
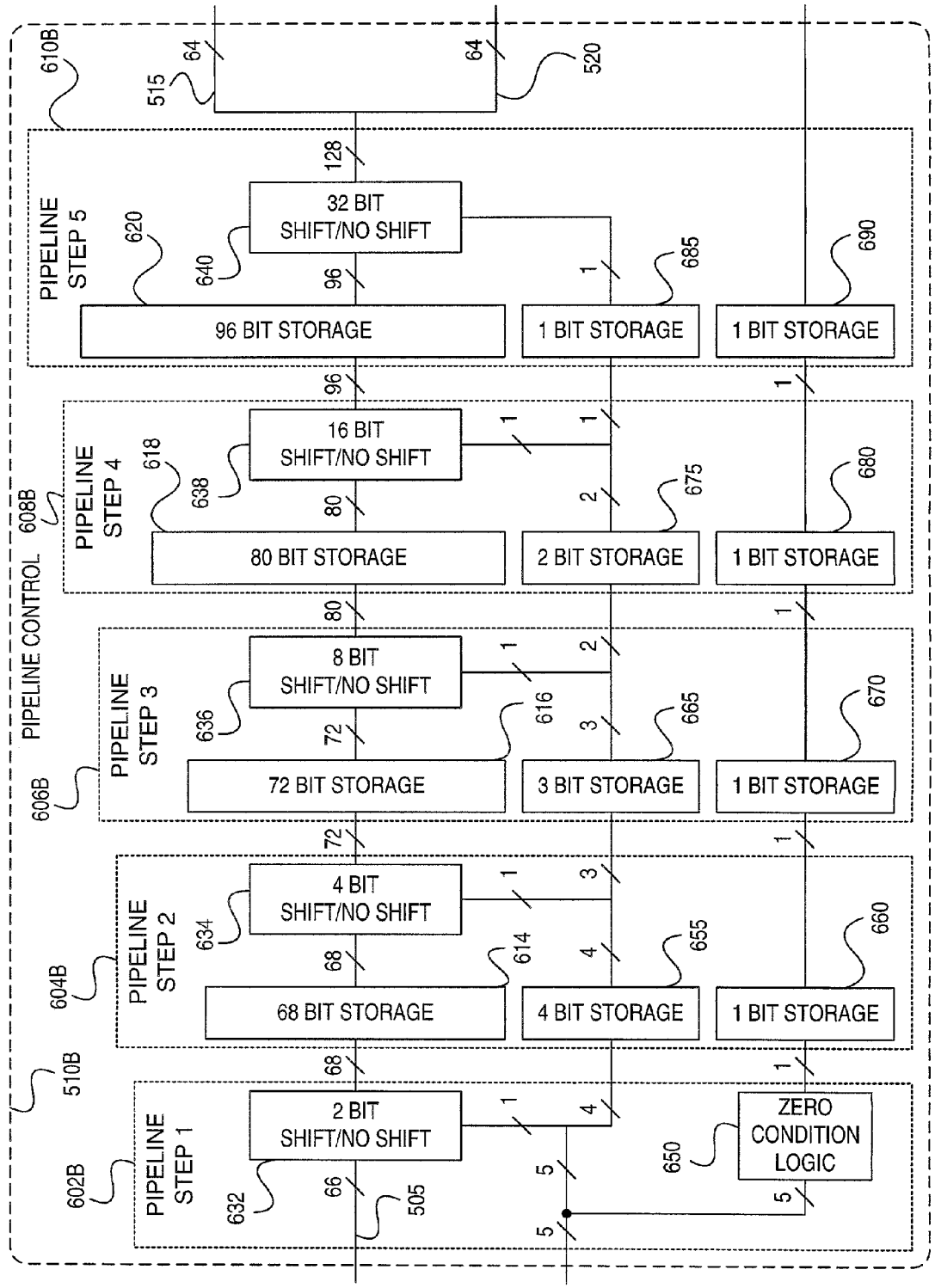
FIG. 6B is a diagram of another preferred embodiment of a pipeline control component.

FIGS. 6A and 6B show different embodiments of pipeline control 510. The general function of pipeline control 510 is to shift the continuous stream of data from 0 to 62 positions, depending on the input cycle.

FIG. 6A shows an embodiment of pipeline control 510A with five pipeline steps 602, 604, 606, 608, and 610. Each pipeline step 602, 604, 606, 608, and 610 includes storage 612, 614, 616, 618, and 620 for the input data and any necessary zeros, a 5-bit storage 622, 624, 626, 628, and 630 for a cycle value, and a shift control circuit 632, 634, 636, 638, and 640 for making the decision whether to shift. Additionally, pipeline control 510A has a 128-bit final storage 645 and a zero condition logic circuit 650, such as a five-input NOR gate, which is used to alert flow-through logic circuit 535 to the zero condition.

Since there are 32 input cycles, cycle values can be represented as a 5-bit string with five zeros representing the first output cycle, five ones representing the last output cycle, and combinations of ones and zeros representing the middle cycles. The benefit to representing the cycle value as a five bit string is that cycle values can be generated by a conventional counter and each bit can be matched to shift control circuit 632, 634, 636, 638, and 640. For example, depending on the cycle value digit in the $2^0$ position, shift control circuit 632 of first pipeline step 602 will potentially shift the data 2 bits. Similarly, shift control circuit 634 of second pipeline step 604 will potentially shift the data 4 bits depending on the cycle value digit in the $2^1$ position, shift control circuit 636 of third pipeline step 606 will potentially shift the data 8 bits depending on the cycle value digit in the $2^2$ position, etc. Therefore, a cycle value of [10101] (representing the 21st input cycle) will result in shifting the data 2 bits in the first pipeline step 602, 8 bits in the third pipeline step 606, and 32 bits in the fifth pipeline step 610 for a total of 42 bits. Of course, the multi-step embodiment shown in FIG. 6A is just one way to shift the data 42 bits in the 21st input cycle.

In the multi-step approach, each shift control circuit 632, 634, 636, 638, outputs to storage 614, 616, 618, 620, and 645 that can hold the input data and any necessary zeros. Accordingly, storage 614 in second step 604 is 68 bits wide (to accommodate the 66-bit data and a 2-bit shift), storage 616 in third step 606 is 72 bits wide (to accommodate the previous 68 bits and a 4 bit shift), storage 618 in the fourth step 608 is 80 bits wide (to accommodate the previous 72 bits and an 8 bit shift), etc.

The sole purpose of storage 612, 614, 616, 618, 620, 622, 624, 626, 628, 630 and 645 is synchronization. Each pipeline step 602, 604, 606, 608, and 610 is designed to be completed in one cycle so that the flow-through logic circuit 535 can properly ignore the data from a previously completed series during the zero condition. It is therefore conceivable that precise fabrication techniques be used to ensure data flowing from residual portion 515 and current portion 520 is synchronized with data flowing from zero condition logic circuit 535.

FIG. 6B shows a pipeline control 510 embodiment that eliminates the need for initial 66-bit storage 612 and final 128-bit storage 645. Both the data entering the pipeline from conduit 505 and the cycle value are immediately processed by shift control circuit 632 and zero condition logic circuit 650 of first pipeline step 602B. The results are output to storage 614, 655, and 660 of second pipeline step 604B. As long as processing and storage can be accomplished in a single cycle, there is no need to delay the pipelined data with initial storage 612.

Each successive pipeline step 606B, 608B, and 610B uses storage 616, 618, 620, 665, 670, 675, 680, 685, and 690 to synchronize the cycle value and zero condition logic circuit 650 output for simplicity. However, a specific design might allow, for example, shift control circuits 634 and 636 of second and third pipeline steps 604B and 606B to be processed and stored in 80-bit storage 618 in a single cycle. In such a design, all storage 616, 665, and 670 in third pipeline step 606B would be excluded. After the final shift by shift control circuit 640 of fifth pipeline step 610B, pipeline control 610 outputs 615 and 620 are immediately sent to the other transmit 66/64b converter circuit 320B components 525, 630, and 535 to be processed and output by lower data output 540 and upper data output 545 in the same cycle.

The embodiment of FIG. 6B also shows an alternative method of working with cycle values. Since zero condition logic circuit 650 performs its analysis in the first pipeline step 602B, there is no need to retain all 5 digits of the cycle value for each successive pipeline step 604B, 606B, 608B, and 610B. Once the relevant cycle value digit is sent to its matched shift control circuit 632, 634, 636, 638, or 640 it can be disregarded.

However, the result of zero condition logic circuit 650 ("zero condition indicator") must be properly synchronized with the shifted data. If it takes four cycles for data to progress through pipeline control 510, it must also take four cycles for the zero condition indicator to be output from pipeline control 510. Therefore, whenever the shifted data is stored, so should the zero condition indicator.

Figure 7:
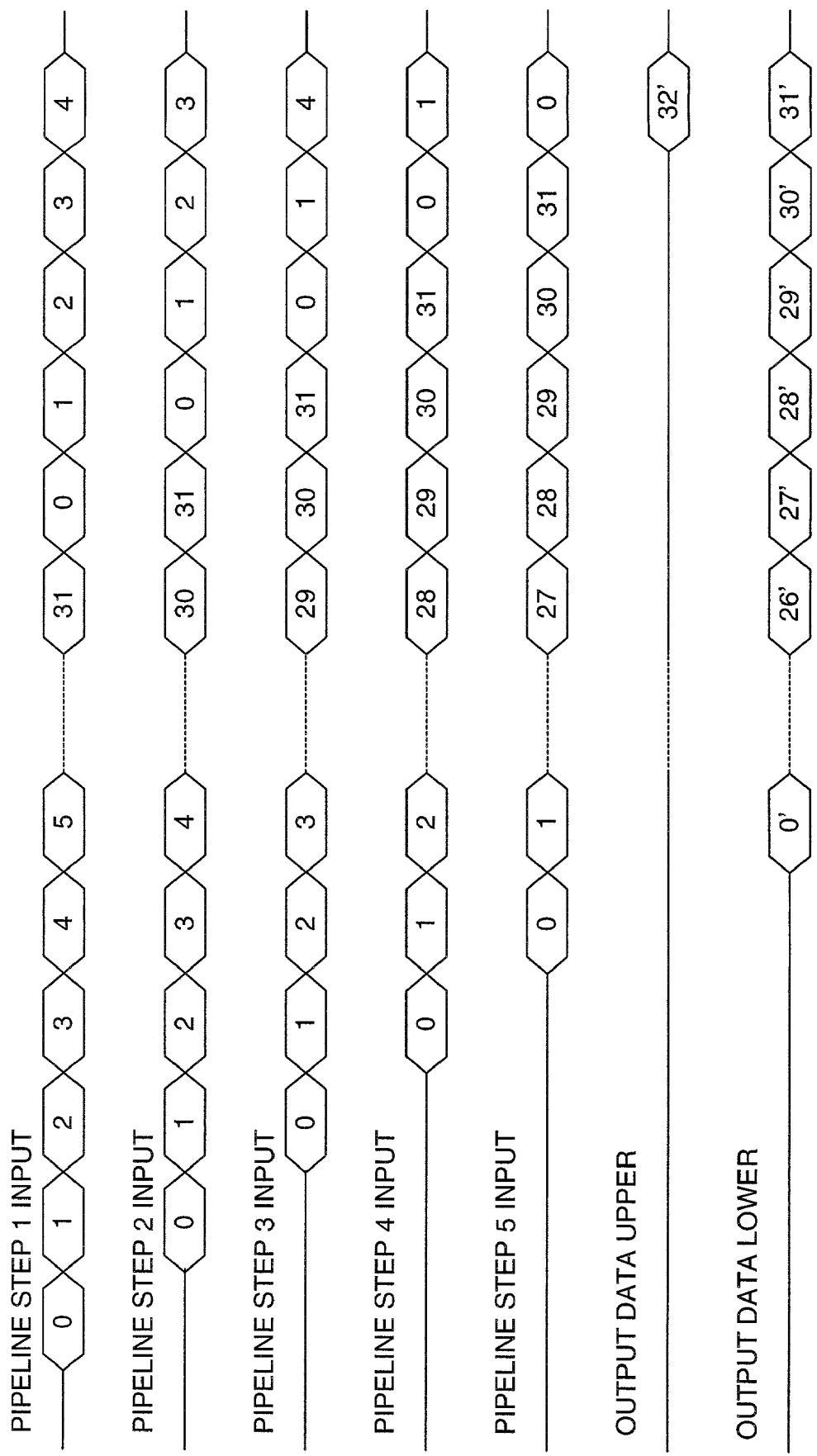
FIG. 7 is a timing diagram for an embodiment of the invention.

FIG. 7 shows a timing diagram for the invention at the first clock rate. The diagram shows that the input to second pipeline step 604 is delayed one cycle from first pipeline step 602, the input to third pipeline step 604 is delayed one cycle from second pipeline step 606, etc. Lower data output 540 is delayed one cycle from fifth pipeline step 610. Upper data output 545 is also delayed one cycle from fifth pipeline step 610, but is only meaningful every 32 cycles.

However, it should be noted that data is taken from transmit 66/64b converter circuit 320A at the intermediate clock rate. In order to ensure the data from lower data output 540 is accessible for an entire cycle at the first clock rate, a pair of 64-bit memories could be added to either the output of transmit 66/64b converter circuit 320A or input to transmit SONET/HDLC circuit 330.

Although the invention has been described in its currently contemplated best mode, it is clear that it is susceptible to numerous modifications modes of operation and embodiments, all within the ability and skill and skill of those familiar with the art and within the exercise of further inventive activity. Accordingly, that which is intended to be protected by patents is set forth in the claims and includes all variations and modifications that fall within the spirit and scope of the invention.

We claim:

1. A system that converts words of pipelined data from a first data width to a smaller second data width over a series of cycles, comprising:
  a pipeline control that generates a word output from the pipeline control that is at least twice as wide as the first data width entering the pipeline control, and shifts the pipelined data within the generated word such that the pipelined data word is, depending on the cycle, either prefixed by zeros, suffixed by zeros, or both, and that outputs a residual portion that is at least as wide as the word output having a second data width and a current portion that is at least as wide as the second data width;
  a delay register that receives at least a portion of the residual portion of the data from the pipeline control and delays the received residual portion one cycle from the current portion of the data from the pipeline control;
  a combiner circuit that compares the delayed residual portion of data from the delay register with the current portion of data from the pipeline control, and outputs data having a width equal to the second data width; and
  output conduits that, for every complete series, transport;
    the current portion of the data during the initial cycle;
    the combiner circuit output during the non-initial cycles; and
    the residual portion of the data during the final cycle.

2. The system of claim 1, wherein:
  the first data width is 66 bits;
  the second data width is 64 bits; and
  the series repeats itself every 32 cycles.

3. The system of claim 1, wherein the system is used in an interface circuit.

4. The system of claim 1, wherein:
  the cycle is identified by a cycle value; and
  the pipeline control includes:
    a plural ity of shift control circuits for shifting the pipelined data, each shift control circuit shifting the data a different amount and being controlled by the cycle value.

5. The system of claim 1, wherein:
  the cycle is identified by a cycle value; and
  the pipeline control includes:
    a plurality of shift control circuits for shifting the pipelined data, each shift control circuit shifting the data a different amount and being controlled by the cycle value.

6. The system of claim 1, further comprising a multiplexer that, in the initial cycle of every series, disregards the result from the combiner circuit and directs the current portion of the data to the output conduit.

7. The system of claim 1, further comprising a zero-loading circuit that, in the initial cycle of every series, replaces the inputs to the combiner circuit with the current portion of data from the pipeline control and zeros such that the output will equal the current portion of the data.

8. A system that converts pipelined data from a first data width to a smaller second data width over a series of cycles, comprising:
  a pipeline control that, depending on the cycle, outputs a residual portion and a current portion;
  a delay register that receives the residual portion of the data from the pipeline control and delays the received residual portion one cycle from the current portion of the data from the pipeline control;
  a combiner circuit that compares the delayed residual portion of data from the delay register with the current portion of data from the pipeline control, and outputs data; and
  a flow-through logic circuit that outputs data having a width as wide as the second data width from the pipelined data in the first cycle in which data is outputted every series of cycles.

9. A transmitting interface comprising:
  a system that encapsulates a data stream and prepares the encapsulated data stream for transmission over an optical network, including:
    a system that encapsulates the data stream;

a system that converts the encapsulated data stream from a first data width to at smaller second data width over a series of cycles, including;
    a pipelined control that, depending on the cycle, shifts encapsulated data and outputs a residual portion that is at least as wide as the second data width and a current portion that is at least as wide as the second data width;
    a delay register that receives at least a portion of the residual portion of the data from the pipeline control and delays the received residual portion one cycle from the current portion of the data from the pipeline control;
    a combiner circuit that compares the delayed residual portion of data from the delay register with the current portion of data from the pipeline control, and outputs data having a width equal to the second data width; and
    a flow-through logic circuit that outputs data having a width that is at least as wide as the second data width from the pipelined data in the first cycle in which data is outputted every series of cycles; and
a system that prepares outputted data for conversion to optical signals;
a system that serializes data streams that are encapsulated and prepared for conversion to optical signals; and
a system that transmits optical signals.

10. A method of converting a series of input data words of a first data width to a series of output data words of a smaller second data width, concatenation of the series of input data being equivalent to concatenation of the series of output data, the series having a sequence including an initial sequence, a non-initial sequence, a final sequence and a non-final sequence, comprising:

identifying a first portion and a second portion of each input data word, the size of each portion depending on the progression of the input series, the size of the first portion initially having a size equal to the second data width, gradually decreasing as the input series progresses, and the size of the second portion gradually increasing until the size is equal to the second data width when the input series is completed;

delaying the second portion of each input data word for at least the non-final sequences of each input series;

combining the delayed second portion with the first portion for at least the non-initial sequences of each input series;

outputting the first portion for the initial sequence of each output series;

outputting the combination during the interim between, the initial sequence and the final sequence; and outputting during the second portion for the final sequence of each completed output series.

11. The method of claim 10, wherein:

the first data width is 66 bits;

the second data width is 64 bits; and each series has a maximum of 32 increments of ordered data words.

12. The method of claim 11, wherein the size of the first portion decreases by 2 bits and the size of the second portion increases by 2 bits for every increment.

13. The method of claim 12, wherein the system is used in an interface circuit.

\* \* \* \* \*

UNITED STATES PATENT AND TRADEMARK OFFICE
CERTIFICATE OF CORRECTION

| | |
|---|---|
| PATENT NO. | : 7,006,527 B1 |
| APPLICATION NO. | : 09/977031 |
| DATED | : February 28, 2006 |
| INVENTOR(S) | : O'Connor |

It is certified that error appears in the above-identified patent and that said Letters Patent is hereby corrected as shown below:

Col. 8, line 25: Please delete "plural ity" and substitute therefor --plurality--.

Col. 10, line 18: Please delete "during" after the word "outputting".

Signed and Sealed this

Seventeenth Day of October, 2006

JON W. DUDAS
*Director of the United States Patent and Trademark Office*